United States Patent [19]

Ochi et al.

[11] Patent Number: 4,945,272
[45] Date of Patent: Jul. 31, 1990

[54] ALTERNATOR FOR MOTOR VEHICLES

[75] Inventors: Daisuke Ochi; Yasuhiro Yoshida; Yoshiyuki Iwaki, all of Hyogo, Japan

[73] Assignee: Mitsubishi Denki Kabushiki Kaisha, Tokyo, Japan

[21] Appl. No.: 379,385

[22] Filed: Jul. 13, 1989

[30] Foreign Application Priority Data

Aug. 6, 1988 [JP] Japan ................ 63-104314

[51] Int. Cl.$^5$ ............................ H02K 5/00
[52] U.S. Cl. ...................... 310/91; 310/89; 310/258; 123/195 A; 123/198 R; 248/674; 403/348
[58] Field of Search ............. 310/91, 68 D, 258, 263, 310/89, 42, 51; 248/205.1, 674; 403/348; 123/195 A, 195 E, 198 R

[56] References Cited

U.S. PATENT DOCUMENTS 3,482,125 12/1969 Fleckenstein ............ 310/89
3,707,037 12/1972 Gutris ..................... 310/89
4,849,665 7/1989 Kitamura et al. .......... 310/51

OTHER PUBLICATIONS

A Copy of Application, "Fixing Mechanism for Alternator for Vehicle", Ser. No. 160,413, filed 02/25/88; Y. Kitamura et al.

Primary Examiner—R. Skudy
Attorney, Agent, or Firm—Sughrue, Mion, Zinn, Macpeak and Seas

[57] ABSTRACT

An alternator for motor vehicles having a mounting structure suitable for mounting to an engine, in which at least one mounting projecting section having U-grooves in a direction perpendicular to the direction of the axis of rotation is formed integral with each of the front and rear brackets constituting a housing so as to enable mounting the alternator to an engine. The alternator thus constituted has a simple, low-cost mounting structure and improved strength such as vibration resistance.

5 Claims, 3 Drawing Sheets

ALTERNATOR FOR MOTOR VEHICLES

BACKGROUND OF THE INVENTION

1. Field of the Invention

The present invention relates to an alternator for motor vehicles which has a mounting structure suitable for mounting to an engine.

2. Description of the Prior Art

FIG. 1 is a view showing the appearance of a conventional alternator for motor vehicles. A front bracket 1 is provided integrally with a lower flange 2a and an upper flange 2b which are projecting sections for mounting. The lower flange 2a is provided with lower mounting bosses 4a and 4b having mounting bolt holes 3a and 3b which are drilled in a direction perpendicular to the direction of the axis of rotation, and through which mounting bolts not illustrated are inserted to fixedly tighten the alternator for motor vehicles to an engine not shown. The upper flange 2b is also provided with an upper mounting boss 4c having a mounting hole 3c drilled in a direction perpendicular to the direction of the axis of rotation. Numeral 5 denotes a stator, which is partly fitted between the front bracket 1 and a rear bracket 6 and securely fastened by through bolts 7. A flange 8 formed integral with this rear bracket 6 is fixedly mounted by a bolt 10 to the lower flange 2a through a bushing 9. Numeral 11 is a pulley for transmitting the rotation of the engine not shown, through a belt, to a rotor not shown which is rotatably supported inside of the alternator for motor vehicles.

The front bracket 1 and the rear bracket 6 described above are commonly produced by casting. After casting, those parts which require dimensional accuracy, for example the mounting bolt holes 3a, 3b and 3c and the mounting bosses 4a, 4b and 4c, are machined and used. As well known, in casing extremely long and thick parts, such problems as cavities or shrinkage are likely to occur. In machining, a better efficiency is obtainable by machining only in one direction.

In the mounting structure of the alternator for motor vehicles described above, cavities or shrinkage are likely to occur in casting the lower flange 2a having particularly long-pitch mounting bolt holes 3a and 3b. As regards the machining of the mounting holes 3a, 3b and 3c and the mounting bosses 4a, 4b and 4c, other parts of the brackets such as the through holes through which the bolts 7 are mounted and a section to be fitted to the stator 5 are machined in the axial direction of the alternator for motor vehicles. In this case, however, the machining is done in a direction perpendicular to the axial direction, with the result that the machining efficiency will become lowered and also, plural chucking operations will be required during machining.

The mounting structure of the conventional alternator for motor vehicles is inferior because of excessively deteriorated vibration resistance and strength caused by the presence of cavities or shrinkage occurring during casting or a lowered dimensional accuracy of machining. This alternator, therefore, has presented a secondary problem such as an off centered pulley when mounted on an engine and driven.

SUMMARY OF THE INVENTION

It is an object of the present invention to provide an alternator for motor vehicles that has a mounting structure suitable for mounting to an engine and can improve vibration resistance and strength after mounting.

It is another object of the present invention to provide an alternator for motor vehicles that has a mounting structure which is simple and able to improve machining efficiency.

To accomplish the above-described objects, the alternator for motor vehicles of the present invention has the front and rear brackets either provided with at least one integrally formed mounting projecting section having a U-groove formed in a direction perpendicular to the direction of the axis of rotation.

That is, the alternator for motor vehicles according to the present invention is of such a constitution that since a U-groove is provided in the flange mounting section of each bracket, the brackets can be formed by casting. No machining is needed. Therefore, if the span between the U-grooves in the flanges of the front and rear brackets is long, the flanges in which the U-grooves are formed, being separate members, will not become long and thick.

DETAILED DESCRIPTION OF THE PREFERRED EMBODIMENTS

Figure 1:
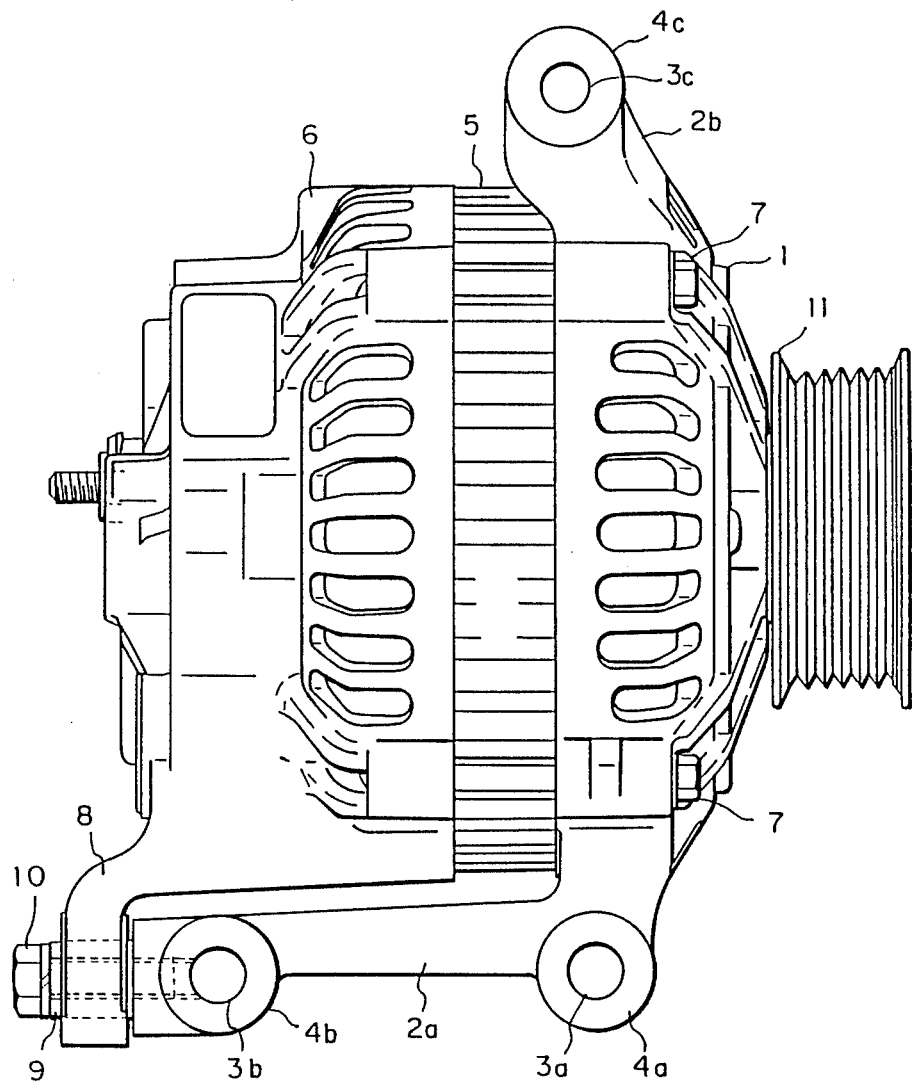
FIG. 1 is a side view showing the appearance of a conventional alternator for motor vehicles.
Figure 2:
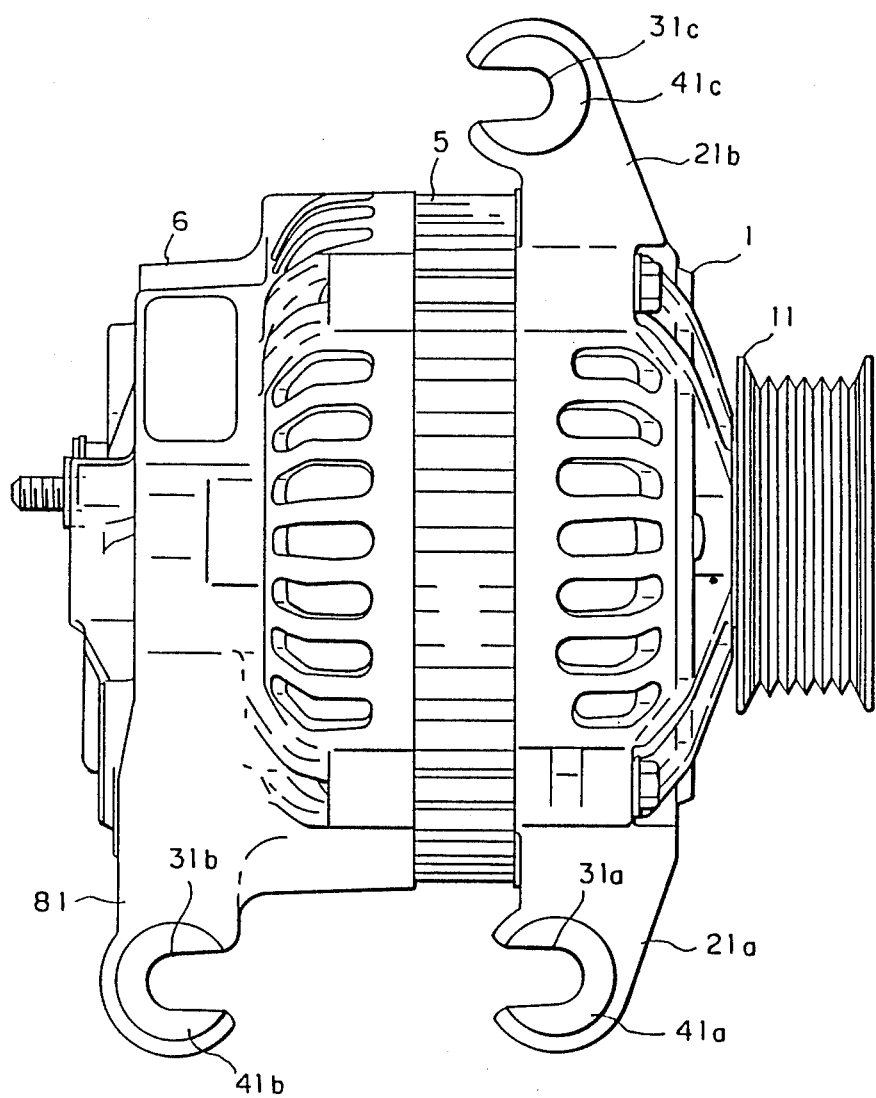
FIG. 2 is a side view showing the appearance of an alternator for motor vehicles according to one embodiment of the present invention.

In FIG. 2, upper and lower flanges 21a and 21b of the front bracket 1 are provided with mounting bosses 41a and 41c having U-grooves 31a and 31c formed in a direction perpendicular to the direction of the axis of rotation in which mounting bolts for tightening the alternator to an engine are mounted. Similarly, a flange 81 of the rear bracket 6 is provided with a mounting boss 41b having a U-groove 31b formed in a direction perpendicular to the axial direction.

The mounting bosses 41a and 41c are formed integral with the front bracket 1; and the mounting boss 41b, with the rear bracket 6. Therefore, if the mounting pitch between the mounting bosses 41a and 41b is extremely long, it is unlikely that the flanges 21a, 21b and 81 will become partly excessively long or thick. Accordingly, there will never take place such a problem in casting as cavities and shrinkage. Also, since the flange 21a is not long like the conventional one, it is unnecessary to provide a flange for the purpose of increasing strength to support it. It is, therefore, possible to provide a compact alternator for motor vehicles which is small in overall length. Also, since the alternator is mounted to the engine at the U-grooves 31a, 31b and 31c through which bolts are mounted, these sections can be realized simply by casting, and require no machining, thereby largely improving machining efficiency.

Figure 3:
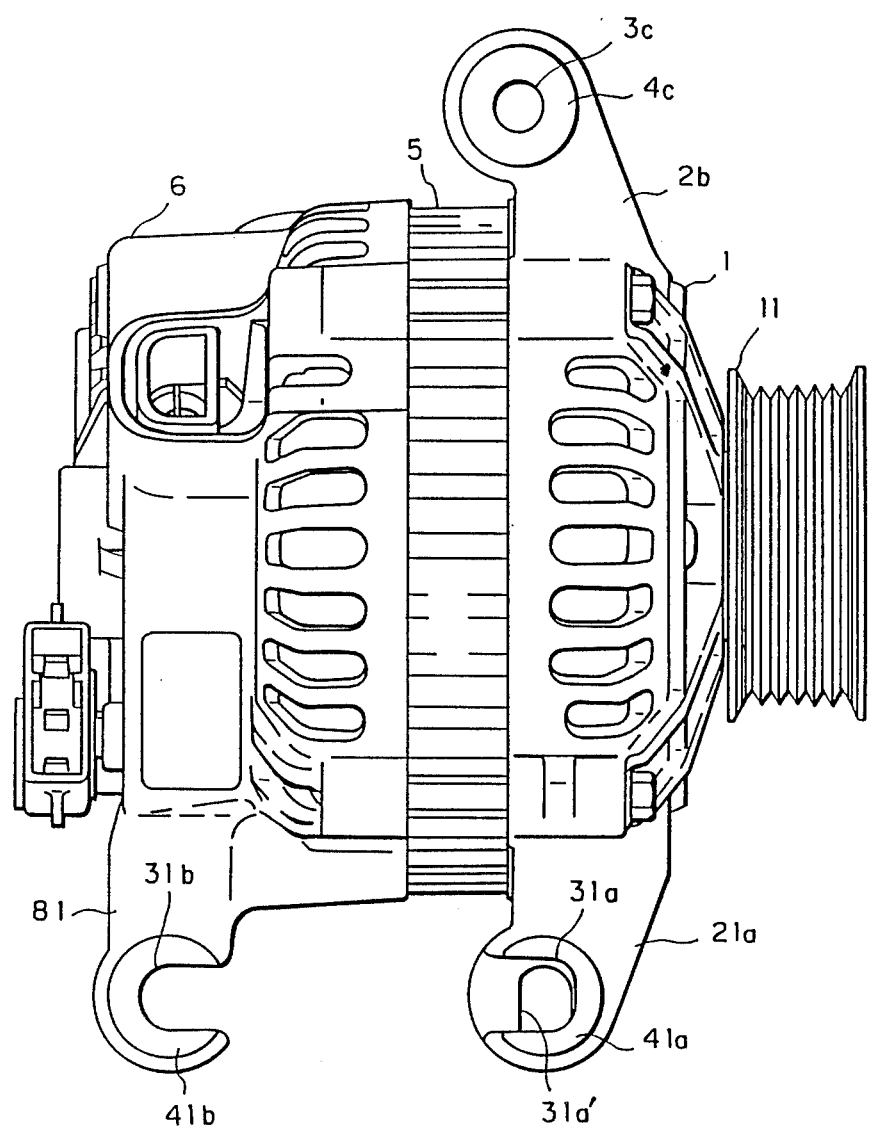
FIG. 3 is a side view showing the appearance of an alternator for motor vehicles according to another embodiment of the present invention.

In the above-described embodiment, the U-groove was applied to every mounting boss; in the embodiment of the present invention, however, the U-groove may be applied to at least one place as shown in FIG. 3. That is, in FIG. 3, the mounting hole 3c is formed in the mounting boss of the upper flange 2b of the front bracket 1 as in the case of the conventional type of alternator. Also, in the embodiment described above, although the opening of the U-groove is made in one direction by each mounting boss, the openings of the U-grooves which at least one mounting boss has, may be formed in alternate directions as shown in FIG. 3. The direction of the openings of the U-grooves may freely be determined in either case. In FIG. 3, in the lower flange 21a of the front bracket 1, the U-groove 31 on this side is formed to open leftwardly and the U-groove 31a' on the other side is formed to open downwardly.

According to the present invention, as described above, the alternator for motor vehicles has such an advantage that it is possible to provide a low-cost alternator for motor vehicles having a simple mounting structure by providing either of the front and rear brackets, with at least one mounting projecting section having U-grooves in a direction perpendicular to the direction of the axis of rotation, and, in addition, to improve strength such as vibration resistance.

What is claimed is:

1. An alternator for motor vehicles having a housing formed with a stator (5) held between a front bracket (1) and a rear bracket (6), characterized by:
   (a) a first mounting flange (21a) extending downwardly from the front bracket, integral therewith, and defining a first boss (41a) having a first U-shaped groove (31a) for accommodating a mounting bolt to secure the alternator to an engine,
   (b) a second mounting flange (81) extending downwardly from the rear bracket, integral therewith, and defining a second boss (41b) having a second U-shaped groove (31b) for accommodating an engine mounting bolt, and
   (c) a third mounting flange (21b; 2b) extending upwardly from the front bracket, integral therewith, and defining a third boss (41c; 4c) for accommodating an engine mounting bolt, wherein
   (d) said first and second grooves have axes perpendicular to the direction of an axis of rotation of the alternator, and
   (e) said first and second grooves are oppositely oriented such that openings thereof face each other.

2. An alternator according to claim 1, wherein the first or the second boss has two axially spaced, U-shaped grooves oriented in different directions.

3. An alternator according to claim 1, wherein the third boss has a third U-shaped groove (31c) with an axis perpendicular to said axis of rotation of the alternator, and said third groove is oriented in the same direction as the first groove.

4. An alternator according to claim 2, wherein the third boss has a bolt hole (3c) extending therethrough along an axis perpendicular to said axis of rotation of the alternator.

5. An alternator according to claim 1, wherein the first and second grooves extend over the entire axial lengths of the respective first and second bosses.

* * * * *